R. RICHESON.
TIES FOR GRAIN SHEAVES.

No. 179,063.                    Patented June 20, 1876.

ATTEST,
Charles Pickles
Chas. J. Gooch

INVENTOR
Richard Richeson
By Knight Bro.
Attys.

UNITED STATES PATENT OFFICE.

RICHARD RICHESON, OF EWING, ILLINOIS.

IMPROVEMENT IN TIES FOR GRAIN-SHEAVES.

Specification forming part of Letters Patent No. 179,063, dated June 20, 1876; application filed June 21, 1875.

*To all whom it may concern:*

Be it known that I, RICHARD RICHESON, of Ewing, Franklin county, State of Illinois, have invented a certain new and useful Improvement in Ties for Grain-Sheaves, of which the following is a specification.

This tie consists of a single piece of wire, which is formed into hooks at both ends, to engage the ends of the cord which passes around the sheaf. One end of the cord is nipped firmly and fast in one end of the wire, and the other end of the wire is formed into an acute hook, which nips the cord at any part where it is drawn into the angle.

Figure 1:
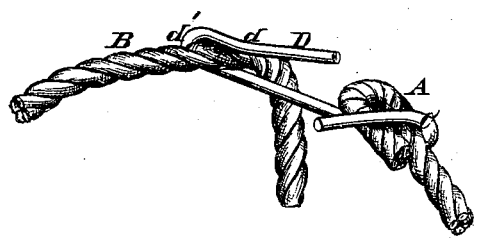
Figure 2:

In the drawings, Figure 1 is a perspective view of the tie, with the ends of the cord engaged upon it. Fig. 2 is a side view of the wire tie.

A and B are the opposite ends of a cord or twine that passes around the sheaf. The end A is fixed in the hooked end C of the wire. The end D of the wire is in form of an acute hook, that nips and holds the cord at any part, as shown at B, the cord being simply drawn forcibly into the hook in binding the sheaf, and jerked from the hook in unbinding the sheaf. The hook from $d$ to the bend $d'$ is made, preferably, with the sides about parallel, so as to gripe the cord across its whole width, giving a better retention of the cord in the hook, and with less injury to the cord. The elasticity of the wire hook enables it to accommodate itself to cords of varying thicknesses, and its rounded form prevents injury to the cord, though it is nipped with sufficient tightness to avoid slip, so that the same cords may be used year after year.

The end A of the cord is shown folded upon itself, and the end C of the wire mashed upon the fold. This makes a firm and rigid attachment, preventing the hook part from turning or slipping on the cord, and enabling the easy, rapid, and certain manipulation of the hook in binding or unbinding.

Having thus described my invention, what I claim as new, and desire to secure by Letters Patent, is—

As a new article of manufacture, and an improved fastening for the cords of grain-sheaves, the wire tie provided with hooked ends C D, substantially as herein shown and described, the hook C adapted to receive one end, A, of the cord and be mashed thereon, and the acute hook D adapted to receive, hold, and tightly nip the free end B of the cord at any part of the latter.

RICHARD RICHESON.

Witnesses:
 C. O. KELLEY,
 ARTH. W. PATTON.